(12) United States Patent
Harboe et al.

(10) Patent No.: US 7,685,154 B2
(45) Date of Patent: Mar. 23, 2010

(54) METHOD AND SYSTEM FOR GENERATING A PLAY TREE FOR SELECTING AND PLAYING MEDIA CONTENT

(75) Inventors: Gunnar F. Harboe, Evanston, IL (US); Frank R. Bentley, Palatine, IL (US); Crysta J. Metcalf, Cary, IL (US); Vivek V. Thakkar, Elk Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 208 days.

(21) Appl. No.: 11/549,488

(22) Filed: Oct. 13, 2006

(65) Prior Publication Data

US 2008/0091721 A1 Apr. 17, 2008

(51) Int. Cl.
*G06F 17/00* (2006.01)
*G06F 12/00* (2006.01)
*G06F 15/16* (2006.01)

(52) U.S. Cl. ............ 707/102; 707/104.1; 707/200; 709/203

(58) Field of Classification Search .......... 707/1, 707/10, 102, 104.1, 201; 725/52, 53; 709/203
See application file for complete search history.

(56) References Cited

U.S. PATENT DOCUMENTS

| | | | | |
|---|---|---|---|---|
| 5,603,058 A | * | 2/1997 | Belknap et al. ........... 710/35 |
| 5,680,619 A | * | 10/1997 | Gudmundson et al. ..... 717/108 |
| 5,732,067 A | | 3/1998 | Aotake |
| 5,751,281 A | * | 5/1998 | Hoddie et al. ........... 715/203 |
| 6,423,892 B1 | * | 7/2002 | Ramaswamy ............ 84/609 |
| 6,452,609 B1 | * | 9/2002 | Katinsky et al. ......... 715/716 |
| 6,570,587 B1 | * | 5/2003 | Efrat et al. ............. 715/723 |
| 6,664,980 B2 | | 12/2003 | Bryan et al. |
| 6,721,489 B1 | * | 4/2004 | Benyamin et al. ........ 386/46 |
| 6,760,721 B1 | * | 7/2004 | Chasen et al. ........... 707/3 |
| 6,928,433 B2 | * | 8/2005 | Goodman et al. ........ 707/4 |
| 7,136,874 B2 | * | 11/2006 | Mercer et al. .......... 707/104.1 |
| 7,155,676 B2 | * | 12/2006 | Land et al. ............. 715/731 |
| 7,480,694 B2 | * | 1/2009 | Blennerhassett et al. ... 709/203 |
| 2002/0055934 A1 | | 5/2002 | Lipscomb et al. |
| 2002/0112180 A1 | * | 8/2002 | Land et al. ............. 713/200 |
| 2002/0180803 A1 | * | 12/2002 | Kaplan et al. .......... 345/810 |
| 2003/0135857 A1 | * | 7/2003 | Pendakur et al. ........ 725/61 |
| 2003/0156504 A1 | | 8/2003 | Kanegae et al. |
| 2003/0180032 A1 | * | 9/2003 | Barde et al. ............ 386/55 |
| 2004/0155901 A1 | * | 8/2004 | McKee et al. .......... 345/747 |
| 2005/0015464 A1 | * | 1/2005 | Young ................. 709/219 |
| 2005/0086606 A1 | * | 4/2005 | Blennerhassett et al. ... 715/760 |
| 2005/0149872 A1 | * | 7/2005 | Fong et al. ............ 715/727 |
| 2006/0026162 A1 | * | 2/2006 | Salmonsen et al. ...... 707/10 |
| 2007/0282903 A1 | * | 12/2007 | Bustelo et al. .......... 707/104.1 |

FOREIGN PATENT DOCUMENTS

EP 1 521 463 4/2005
WO WO 01/79964 10/2001

* cited by examiner

*Primary Examiner*—Miranda Le

(57) ABSTRACT

A play tree may be generated for selecting and playing media content. A list of media files may be generated and displayed to the user. The user's selection from the list may be received and played to the user. The user's selection may be stored in a media content database and a tree of media files may be generated based on the user's previous selections. The tree may be displayed to the user. If the user makes a selection, the user's selection from the tree is received and played to the user.

12 Claims, 8 Drawing Sheets

METHOD AND SYSTEM FOR GENERATING A PLAY TREE FOR SELECTING AND PLAYING MEDIA CONTENT

BACKGROUND OF THE INVENTION

1. Field of the Invention

The invention relates to a system, method and computer-readable medium for navigating, selecting and playing media content on a media player device.

2. Introduction

The existing solution for playing a number of media files (typically audio files) in sequence is the playlist. This feature is included in most personal computer (PC) media players (e.g., Windows Media Player, iTunes, etc.) and most portable MP3 players (e.g., iPod, Zen, m500, etc.). Playlists are generally set up either manually or automatically by the system and may be generated in advance or on the fly.

However, each of these conventional options has problems for the user. Creating a playlist manually is time-consuming, and doing so on the fly involves frequent disruptive interactions. Creating a playlist in advance poses the risk that by the time the user gets around to listening to later parts of the playlist, he or she will no longer be interested in listening. Playlists generated automatically by a conventional device are rarely perfect and lead to the user having to skip songs frequently. A user who desires to listen to different types of music will have to find a way to switch to playing another playlist or set of tracks.

SUMMARY OF THE INVENTION

A system, method and computer readable medium that generates a play tree for selecting and playing media content is disclosed. The method may include generating a list of media files and displaying the list to the user; receiving the user's selection from the list and playing the selection to the user, storing the user's selection in a media content database, and generating a tree of media files based on the user's previous selections and displaying the tree to the user; wherein if the user makes a selection, receiving the user's selection from the tree and playing the selection to the user.

BRIEF DESCRIPTION OF THE DRAWINGS

In order to describe the manner in which the above-recited and other advantages and features of the invention can be obtained, a more particular description of the invention briefly described above wilt be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a system, method, computer-readable medium, and other embodiments that relate to the basic concepts of the invention.

As discussed in detail herein, a method of generating a play tree is presented that allows a user to play an ordered set of media files that may be arranged not in a linear sequence, but in a branching tree structure, for example. Each node in the tree may represent a file, and its child nodes are the options of what to play next after that file. Playing the tree, then, corresponds to traveling down a certain path of the tree, starting from the root.

For example, the user of a media player may instruct the player to start playing a particular play tree. The first media file in the tree (the root node) starts playing. While it plays, the player displays its child nodes and allows the user to indicate which one media selection (e.g, song, video, TV show, etc.) to play next. If the user has not made a choice by the time the file finishes playing, the system may continue to wait or choose one of the options according to some internal rule (e.g., at random, always a default option, always the same as the last choice made by the user, using a more sophisticated algorithm, etc.).

The play tree data structure may be generated in such a way that proceeding down different paths in the tree corresponds to playlists with different characteristics, and so the user can control the direction the media mix takes by choosing the direction to take at each branch of the tree. In this manner, the user is subtly navigating the media collection as the media is playing.

Thus, the user may be allowed to choose between multiple options for the next media file that is played by the media player. The playlist may branch out to create multiple possible paths through media not only in a very restricted domain, but for an arbitrary library of content, or as a way to navigate a user's media collection, for example. In addition, several dynamic playlists may be generated in parallel.

Figure 1:
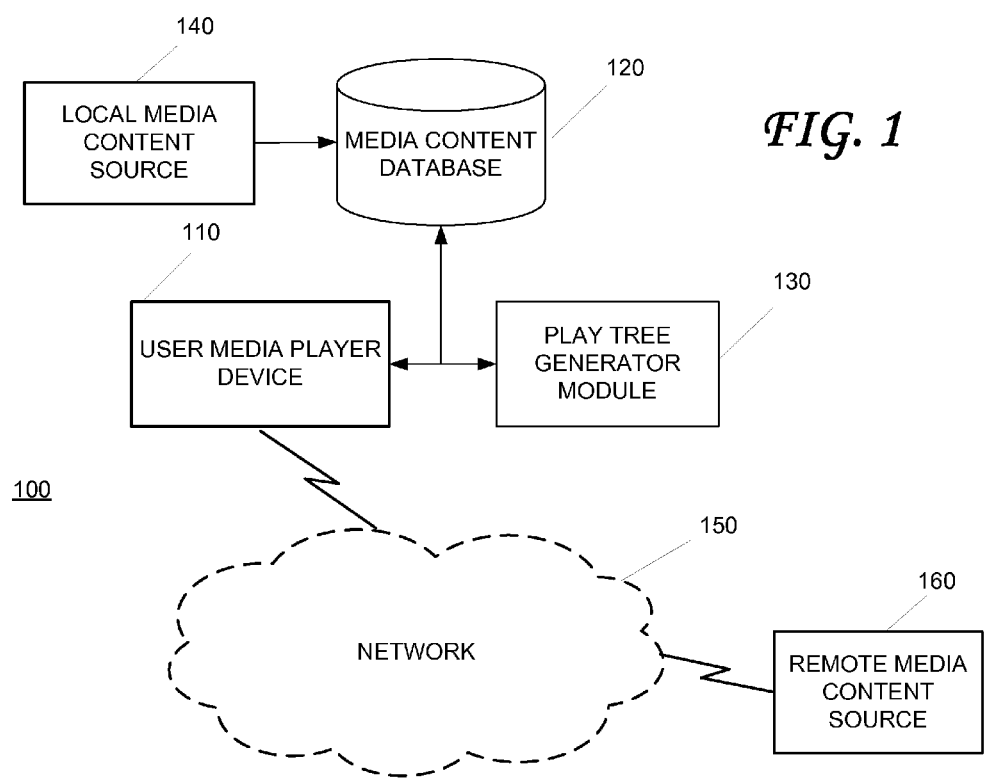
FIG. 1 illustrates an exemplary diagram of a network environment in accordance with a possible embodiment of the invention.

FIG. 1 illustrates an exemplary diagram of a network environment 100 in accordance with a possible embodiment of the invention. In particular, the network environment 100 includes user media player device 110, media content database 120, play tree generator module 130, local media content source 140, network 150 and remote media content source 160.

One of skill in the art will appreciate that the network environment 100 may be any possible configuration in which a user media player device 110 may be accessible to media content. As such, network 150 may represent any communication and/or media network, such as the Internet, intranet, telephone network, wireless network, cable television network, satellite television network, satellite radio network or any other network system capable of hosting domains containing media content that may be downloaded and/or played, for example.

Figure 2:
FIG. 2 illustrates an exemplary diagram of an possible user media player device display.

The user media player device 110 may represent any device that plays stored or live media, such as a portable MP3 player, satellite radio receiver, AM/FM radio receiver, cable or satellite television or set-top box, iPod, personal computer, digital video recorder, wireless communication device, cellular telephone, mobile telephone, personal digital assistant (PDA), etc., for example. FIG. 2 is an exemplary user media player device 110 display screen showing a possible list of songs according to the embodiment shown in FIG. 1. The play tree generator module 130 generates the list of media from the media content stored in the media content database 120, or media content received from the local media content source 140 or remote media content source 160. While FIG. 2 shows a music example, the invention may be applied to other audio and video media. For example, with respect to television, if one watches a Seinfeld episode, the play tree generator module 130 may present a play tree to the user after the program that contains a selection of comedy and/or other programming options to watch in the following half-an-hour. Further examples of the play tree generator 130 processes will be discussed in detail below.

The media content database 120 may represent any internal or external database, memory, storage device, etc., that may store media content such as audio, video, music, narration, etc., for example. Local media content source 140 may represent any local source that contains media content whereby that content may be transferred to the media content database 120 for playing on the user media player device 110, such as a compact disc (CD), digital video disc (DVD), video tape, memory stick, portable storage device, etc., for example. Remote media content source 160 may represent any database, memory, storage device, server, etc., that may store and transfer media such as audio, video, etc. over a network 150 to remote destinations, such as user media player device 110 and media content database 120, for example.

The network environment 100 and illustrated in FIG. 1 and the related discussion are intended to provide a brief, general description of a suitable computing environment in which the invention may be implemented. Although not required, the invention will be described, at least in part, in the general context of computer-executable instructions, such as program modules, being executed by the user media player device 110, which may represent a general purpose computer, MP3 player, etc., as discussed above.

Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Figure 3:
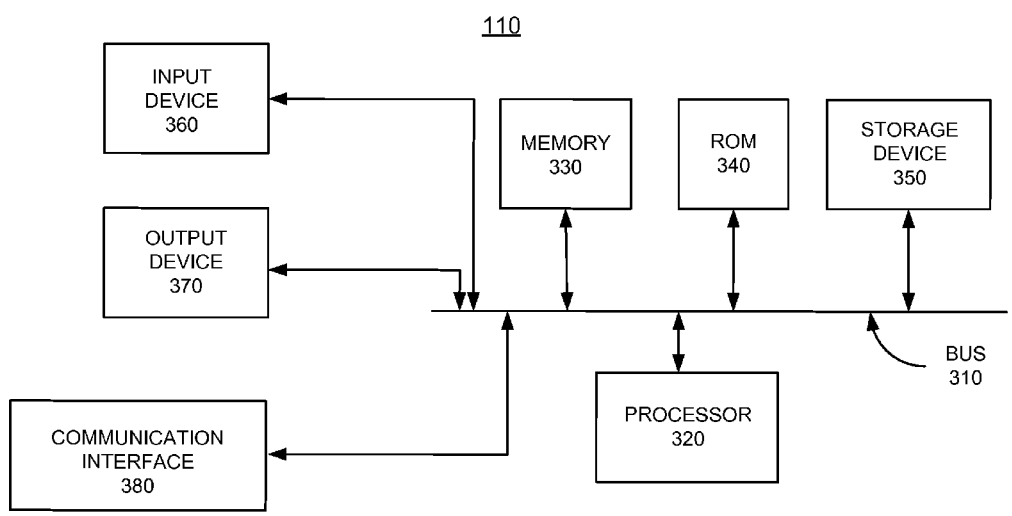
FIG. 3 illustrates an exemplary block diagram of user media player device for implementing the play tree generation process in accordance with a possible embodiment of the invention.

FIG. 3 illustrates an exemplary diagram of a possible user media player device 110 shown in FIGS. 1 and 2 which may implement one or more modules or functions of the play tree generator module 130. Thus, exemplary user media player device 110 may include a bus 310, a processor 320, a memory 330, a read only memory (ROM) 340, a storage device 350, an input device 360, an output device 370, and a communication interface 380. Bus 310 may permit communication among the components of the user media player device 110.

Processor 320 may include at least one conventional processor or microprocessor that interprets and executes instructions. Memory 330 may be a random access memory (RAM) or another type of dynamic storage device that stores information and instructions for execution by processor 320. Memory 330 may also store temporary variables or other intermediate information used during execution of instructions by processor 320. ROM 340 may include a conventional ROM device or another type of static storage device that stores static information and instructions for processor 320. Storage device 350 may include any type of media, such as, for example, magnetic or optical recording media and its corresponding drive.

Input device 360 may include one or more conventional mechanisms that permit a user to input information to the user media player device 110, such as a keyboard, a mouse, a pen, a voice recognition device, touchpad, buttons, etc. Output device 370 may include one or more conventional mechanisms that output information to the user, including a display, a printer, one or more speakers, or a medium, such as a memory, or a magnetic or optical disk and a corresponding disk drive.

Communication interface 380 may include any transceiver-like mechanism that enables the user media player device 110 to communicate via the network 150. For example, communication interface 380 may include a modem, or an Ethernet interface for communicating via a local area network (LAN). Alternatively, communication interface 380 may include other mechanisms for communicating with other devices and/or systems via wired, wireless or optical connections. In some implementations of the network environment 100, communication interface 380 may not be included in exemplary user media player device 110 when the play tree generation process is implemented completely within a single user media player device 110.

The user media player device 110 may perform such functions for implementing the play tree generation process in response to processor 320 by executing sequences of instructions contained in a computer-readable medium, such as, for example, memory 330, a magnetic disk, or an optical disk. Such instructions may be read into memory 330 from another computer-readable medium, such as storage device 350, or from a separate device via communication interface 380, such as the local media content source 140 or the remote media content source 160.

For illustrative purposes, the play tree generation process 130 wilt be described below in relation to the block diagrams shown in FIGS. 1, 2 and 3.

Figure 4:
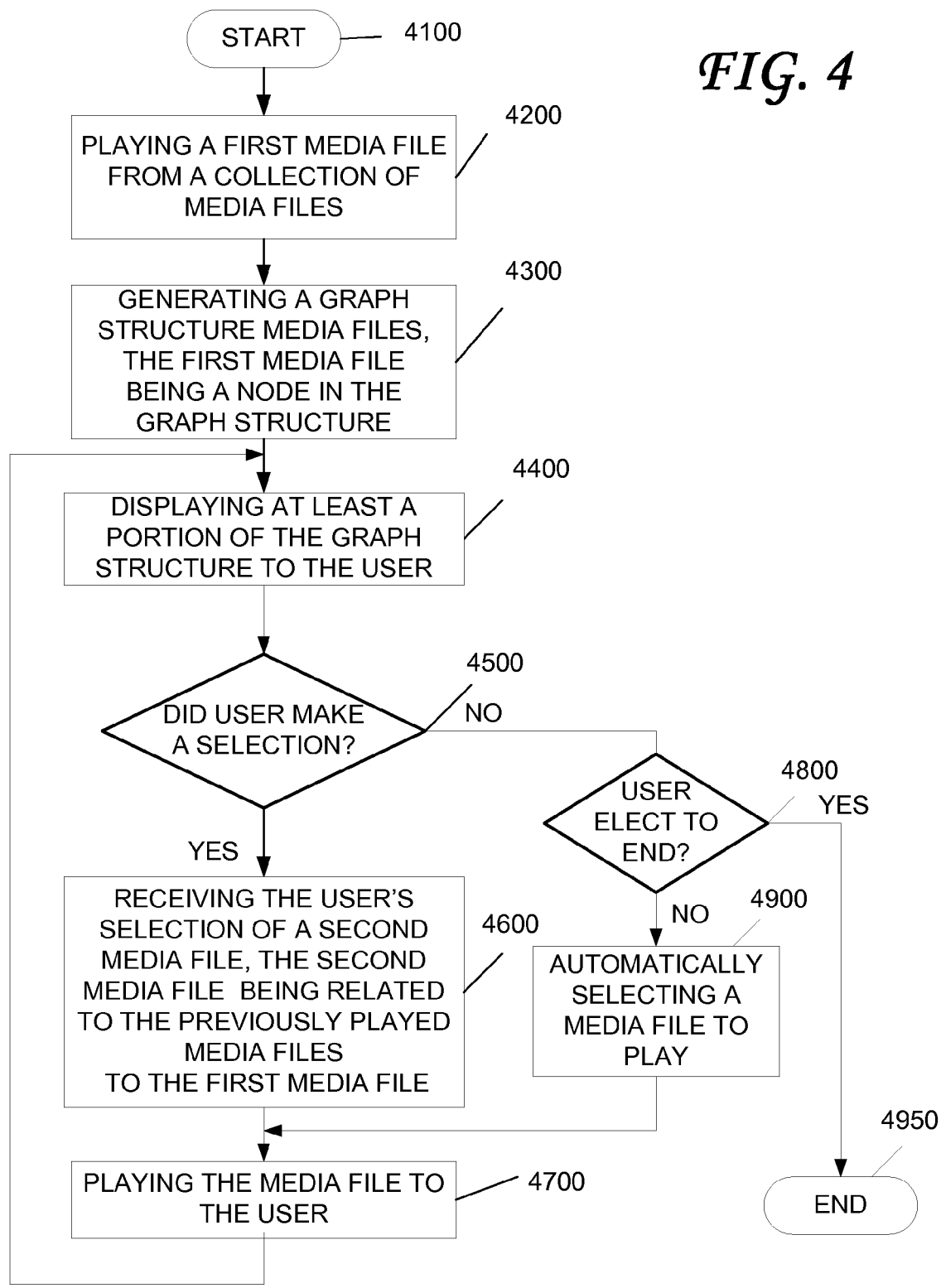
FIG. 4 illustrates an exemplary flowchart illustrating a possible play tree generation process in accordance with a possible embodiment of the invention.

FIG. 4 is an exemplary flowchart illustrating some of the basic steps associated with play tree generation process in accordance with a possible embodiment of the invention. The process begins at step 4100 and continues to step 4200 where the user media player device 110 plays a first media file from a collection of media files to a user.

At step 4300, the play tree generator module 130 generates a graph structure of media files with the first media file being a node in the graph structure. The graph structure may be any structure for illustrating a hierarchy, such as a tree structure. Complex or simple algorithms used by the play tree generator module 130 may provide the minimal functionality needed for the system. For instance, the play tree generator module 130 could build the tree by picking media files at random from the content store. The play tree generator module 130 can also use a branch selection technique that may always pick the first branch option, or pick a branch at random, for example.

There may also be a relationship between a media file in the tree and its child nodes, which the user and the play tree generator module 130 could exploit. Essentially, each branch may represent content with different characteristics. In the user media player device 110 using music as an example, if the current song is Rock, the branches might represent Rock (cont'd), Jazz, Pop, and Classical. Alternatively, they might represent "your favorite music", "music you haven't heard in a while", "your recent music" and "music you haven't listened to yet," for example Depending on which one the user chooses, the user media player device 110 will play that kind of music. For example, one of the branches for selection may be configured to always continue with the same type of music as is currently playing.

The play tree generator module 130 may also use biased random playlist generation technique. For example, the play tree generator module 130 may generate a biased random playlist by picking media files from the media content database 120 according to probabilities associated with each file. These probabilities may be calculated with a function expression that takes the metadata for each file, as well as other information, as input. For example, the play tree generator module 130 may consider contextual information, such as the particular individuals present when the media is being player. The details of this technique, as well as the nature of the media files in the media content database 120 determine the profile of the resulting playlist.

These functions may be parameterized, and by varying the values of the parameters, the characteristics of the corresponding playlist can change smoothly. For instance, a simple technique could be stated informally as "play my favorite songs (the ones the user played most frequently), but not ones that have been played recently." By varying the degree of skew in favor of more frequent files, or the degree of skew against recently played files, the playlist may also vary.

At step 4400, the play tree generator module 130 displays at least a portion of the graph to the user. In this manner, the play tree generator module 130 may display the entire graph structure to the user or only a part.

As discussed above, FIG. 2 is an exemplary user media player device 110 interface display screen showing a possible list of songs. The play tree generator module 130 generates the list of songs from the media content stored in the media content database 120, or media content received from the local media content source 140 or remote media content source 160. Thus, the play tree generator module 130 provides users with a list of options for what media file to play next in a mix. For example, in FIG. 2 the currently playing song ("With or Without You") is displayed, along with four possibilities for which song to play next. The second option ("Drive My Car") is highlighted, indicating that this is the current selection, and is the song that will play next unless the user actively changes the selection. If the user would prefer one of the other options, he or she may press the button marked "Select [down]" to cycle through them (one press for "Rid of Me," two for "Black Coffee," three for "Only Happy When It Rains").

One of skill in the art will appreciate that the media player device 110 interface is shown here for purposes of illustration only. Many other possible designs of displays and controls, as well as variations in interaction flow, are within the spirit and scope of the invention.

At step 4500, the play tree generator module 130 determines whether the user makes a selection. If the user makes a selection from the tree, at step 4600, the play tree generator module 130 receives the user's selection from the tree and at step 4700, user media player device 110 plays the selection to the user. The process the returns back to step 4400 where the play tree generator module 130 displays at least a portion of the graph structure to the user.

If the user does not make a selection in step 4500, the process goes to step 4800 and determines whether the user has elected to end the media playing session. If after a timeout period or affirmation from the user, the play tree generation module 130 has determined that the user has not elected to end the media playing session, at step 4900, the play tree generation module 130 automatically selects a media file to play to the user from the graph structure. The process goes to step 4700 and the automatic selection is played to the user.

If the user does not make a selection in step 4500, and the process determines at step 4800 that the user has elected to end the media playing session, the process goes to step 4950 and ends.

Figure 5:
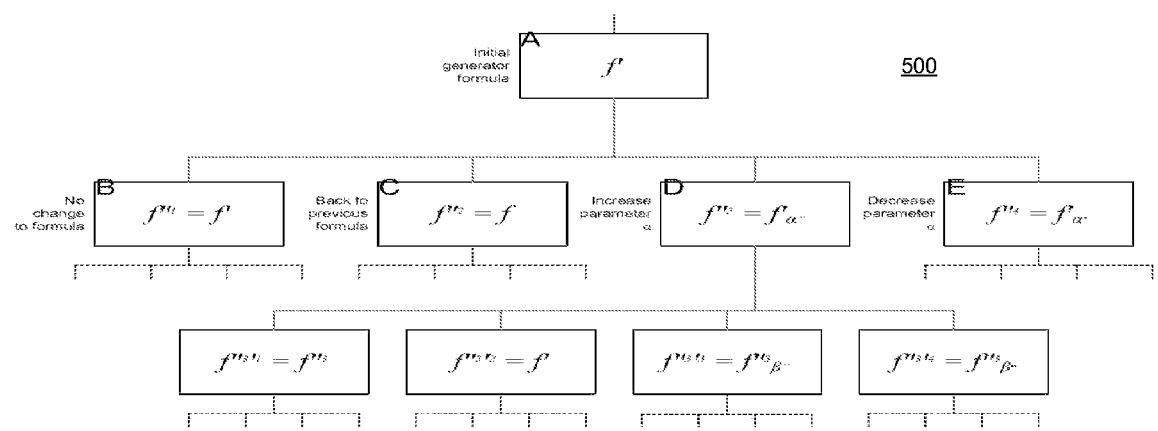
FIG. 5 illustrates an exemplary diagram of a possible play tree generation scheme in accordance with a possible embodiment of the invention.

FIG. 5 shows an exemplary play tree generation technique to adapt the play tree 500 to the user's preferences. An initial function expression is associated with the root node in the tree, and this formula is inherited by its child nodes, but with some degree of random variation of the parameters. By choosing one of the child nodes, the user provides the "natural selection" that causes the function to evolve towards something better. This adaptiveness also allows the play tree generator module 130 to keep pace as the user's preferences change.

For instance, let A be the root node of a play tree, and let f be the function associated with it. Now the formula for each of the child nodes B, C, D, E is varied slightly in different ways: $f'^1, f'^2, f'^3, f'^4$. The media file associated with each node is an element from the playlist generated by that node's formula.

In order for the play tree generator module 130 to provide a satisfying user experience, it is important to vary the function expressions of the child nodes in an effective manner. It should be trivial to keep playing the same kind of media content as is currently playing. It should also be possible to "undo" a choice and the consequences of that choice making the process of changing the formula as efficient as possible.

Thus, in FIG. 5, one of the branches may represents "the current formula without any changes," one may represent "the formula as it was before the last change," and two branches may represent higher and lower values of one parameter in the formula, respectively.

The branch selection process may be as simple as to always select the branch with the unmodified formula. In this manner, if the user takes no action, the play tree generator module 130 may simply play a sequence of media files generated by the initial biased random playlist generation process, for example.

Note that while in a tree structure, different branches never join together, and there are no loops. These restrictions should not limit the scope of this invention. Although the discussion herein concerns "trees" specifically, the invention encompasses the more general case of any directed graph with or without a designated starting node. Also, because the nodes in the tree are merely references to media files, not the files themselves, several different nodes in the tree could refer to the same file. Additionally, weights may be assigned to the branches (or edges), with the weights determining the probability of playing one file following the other. It should also be noted that although in this description the nodes in the play tree are media files, they could also be playlists, so that trees of albums etc. could be defined.

Figure 6:
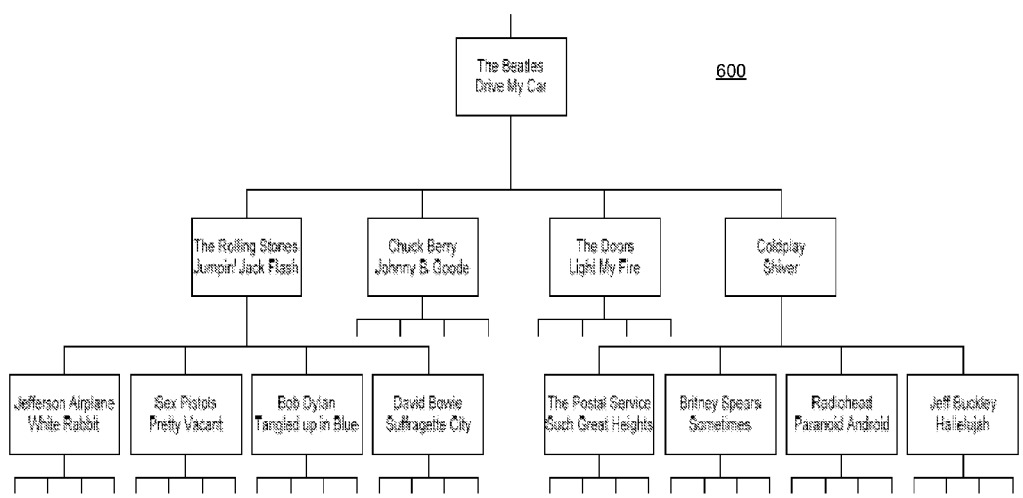
FIG. 6 illustrates an exemplary diagram of a possible play tree in accordance with a possible embodiment of the invention.
Figure 7:
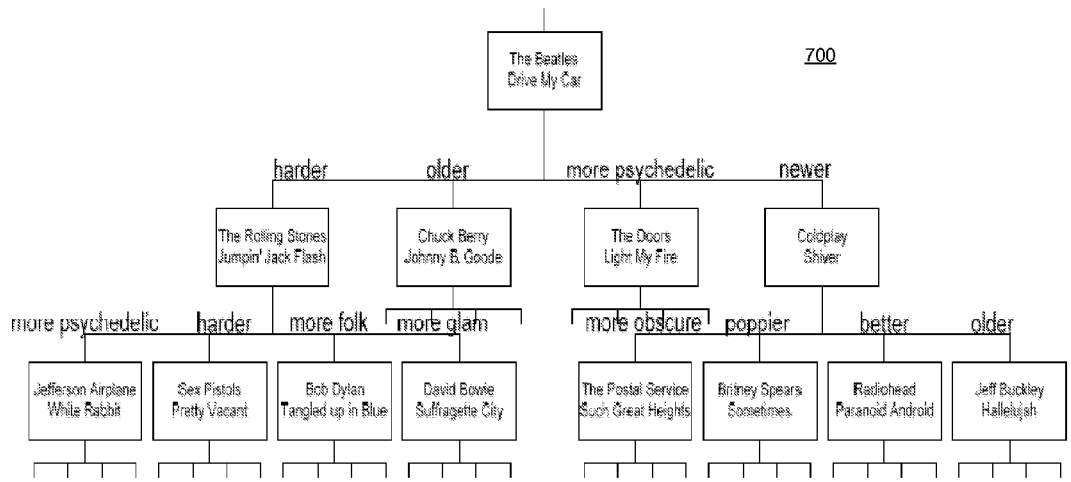
FIG. 7 illustrates an exemplary diagram of a possible play tree in accordance with a possible embodiment of the invention.
Figure 8:
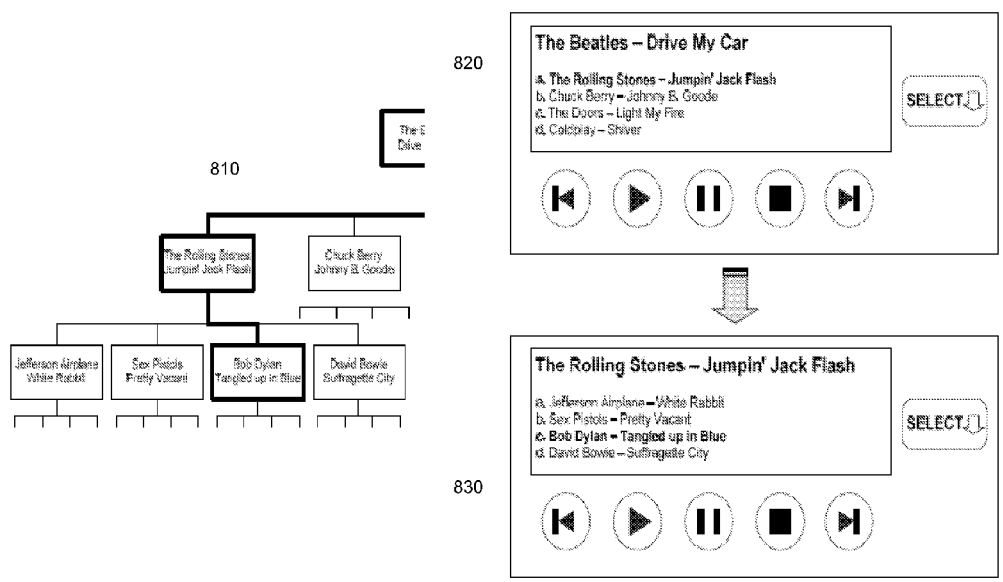
FIG. 8 illustrates an exemplary diagram of a possible play tree path and related user media player device display in accordance with a possible embodiment of the invention.

FIGS. 6-8 illustrate an example of a playlist generation process providing the user with options of media to play next, as described above. FIG. 6 shows an example of a portion of a play tree for a music player, with the first two levels corresponding to the selection of "Drive My Car" example in FIG. 2. The play tree 600 in FIG. 6 illustrates a diagram of the options available at all times, and the consequences of selectiong one of the options. For instance, if the user is listening to "Drive My Car" and chooses "Jumpin' Jack Flash" as the next song, the play tree generator module 130 will present the options "White Rabbit," "Pretty Vacant," "Tangled up in Blue," and "Suffragette City." Each of these choices will lead to different options at the next step. As shown in FIG. 7, the options are assigned different categories according to different types of music, for example.

In this particular example, the play tree has a constant branching factor of four. In general, the number of options may differ from node to node. A node may have no successors (in which case play stops after it has been played), one single successor (in which case it works like a conventional playlist), or multiple successors with no upper limit on their number.

As shown in FIG. 8, the play tree 810 selections move from "Drive My Car" to "Jumpin' Jack Flash" to "Tangled up in Blue," for example. The user media player device 110 interface display 820 will then change to reflect the new branch in the play tree 810 as illustrated in the user media player device 110 interface display 830.

There are several well-known ways to represent a tree data structure. Note that the tree does not in all cases need to be explicitly stored. Functions that implement suitable techniques may provide the nodes and branches as they are needed. Nor does the tree need to be completely determined in advance. For instance, in FIG. 6, it may only be necessary to decide the options for the song after "Tangled up in Blue" if and when the user chooses that branch.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the user media player device 110 and the play tree generator module 130 shown in FIGS. 1 and 3 each processing the content in various possible ways. It does not necessarily need to be one system used by all end users. Accordingly, the appended claims and their legal equivalents should only define the invention, rather than any specific examples given.

We claim:

1. A method for generating a play tree for selecting and playing media content, the method comprising:
    playing a first media file from a collection of media files to a user;
    generating a graph structure of media files based on the played first media file, the first media file being a node in the graph structure;
    storing the generated graph structure in a media player device;
    displaying at least a portion of the graph structure to the user, the displayed portion including a plurality of media files, the plurality of media files being related to the first media file;
    receiving the user's selection of a second media file from the displayed plurality of media files; and
    playing the second media file to the user, wherein the method is recursive and all media files are nodes in the play tree such that from any media file another media file can be directly selected, wherein one of the media is selected automatically from the graph structure based on one of: sensor data and a preference profile of the user.

2. The method of claim 1 further comprising:
    generating a list of media files;
    displaying the list of media files to the user;
    receiving the user's selection from the displayed list; and
    playing the received selection to the user.

3. The method of claim 1 further comprising:
retrieving media files from at least one of: a local media content source and a remote media content source.

4. The method of claim 1 wherein the media files are one of: music, video, narration, audio, and television programming.

5. The method of claim 1 wherein the graph structure is a tree structure.

6. The method of claim 1 wherein the media files are played on a media player device, the media player device being one of: a cellular telephone, mobile telephone, wireless communication device, MP3 player, personal computer, personal digital assistant, iPod, satellite radio receiver, AM/FM radio receiver, cable television receiver, digital video recorder, and satellite television receiver.

7. An electronic device that generates a play tree for selecting and playing media content, the device comprising:
- a media content database that contains a collection of media content;
- a media player device that plays a first media file from the collection of media files to a user;
- a play tree generator module that generates a graph structure of media files based on the played first media file, the generated graph structure being stored in a media player device; the first media file being a node in the graph structure, displays at least a portion of the graph structure to the user, the displayed portion including that includes a plurality of media files, the plurality of media files being related to the first media file, receives the user's selection of a second media file from the displayed plurality of media files, wherein the media player device plays the second media file to the user and all media files are nodes in the play tree such that from any media file another media file can be directly selected and the play tree generation is recursive, wherein the play tree generator module automatically selects a media file from the graph structure based on one of: sensor data and a preference profile of the user.

8. The electronic device of claim 7 wherein the play tree generator module generates a list of media files, displays the list to the user, receives the user's selection from the list; and plays the selection to the user.

9. The electronic device of claim 7 wherein the play tree generator module retrieves media files from at least one of: a local media content source and a remote media content source.

10. The electronic device of claim 7 wherein the media files are one of: music, video, narration, audio, and television programming.

11. The electronic device of claim 7 wherein the graph structure is a tree structure.

12. The electronic device of claim 7 wherein the electronic device is one of: a cellular telephone, mobile telephone, wireless communication device, MP3 player, personal computer, personal digital assistant, iPod, satellite radio receiver, AM/FM radio receiver, cable television receiver, digital video recorder, and satellite television receiver.

* * * * *